(12) United States Patent
Caudill

(10) Patent No.: US 8,006,995 B2
(45) Date of Patent: Aug. 30, 2011

(54) BOAT TRAILER WITH ADJUSTABLE RAILS AND AN AUTOMATIC LATCH

(76) Inventor: Chester Caudill, Morehead, KY (US)

( * ) Notice: Subject to any disclaimer, the term of this patent is extended or adjusted under 35 U.S.C. 154(b) by 66 days.

(21) Appl. No.: 12/653,084

(22) Filed: Dec. 7, 2009

(65) Prior Publication Data

US 2011/0133429 A1 Jun. 9, 2011

(51) Int. Cl.
*B60P 3/10* (2006.01)
(52) U.S. Cl. .................................................. 280/414.1
(58) Field of Classification Search ................ 280/414.1
See application file for complete search history.

(56) References Cited

U.S. PATENT DOCUMENTS

| 3,217,053 | A | * | 11/1965 | Kovach et al. | ................ | 585/466 |
| 4,715,768 | A | * | 12/1987 | Capps | ........................... | 414/535 |
| 4,946,332 | A | * | 8/1990 | Daniels | ........................ | 414/477 |
| 5,013,206 | A | * | 5/1991 | Ernst et al. | .................... | 414/483 |
| 5,228,713 | A | * | 7/1993 | Kovach | ...................... | 280/414.1 |
| 5,332,249 | A | * | 7/1994 | Solberg et al. | ............. | 280/414.1 |
| 5,895,185 | A | * | 4/1999 | Spence | ....................... | 280/414.1 |
| 6,099,014 | A | * | 8/2000 | McLaughlin | .............. | 280/414.1 |
| 2003/0137124 | A1 | * | 7/2003 | Marchese | ................... | 280/414.1 |
| 2008/0265543 | A1 | * | 10/2008 | Davis et al. | ................ | 280/414.1 |

\* cited by examiner

*Primary Examiner* — Tony H. Winner
(74) *Attorney, Agent, or Firm* — Stockwell & Smedley, PSC

(57) ABSTRACT

The present invention relates to a boat trailer that has sloped and adjustable guide rails which are higher at the rear of the trailer as compared to the front of the trailer. Accordingly, when backed down a boat ramp the guide rails extend above the water in order to engage the pontoons of a boat. This arrangement of guide rails allows a boat to powered onto the trailer where it can automatically be latched into place.

14 Claims, 8 Drawing Sheets

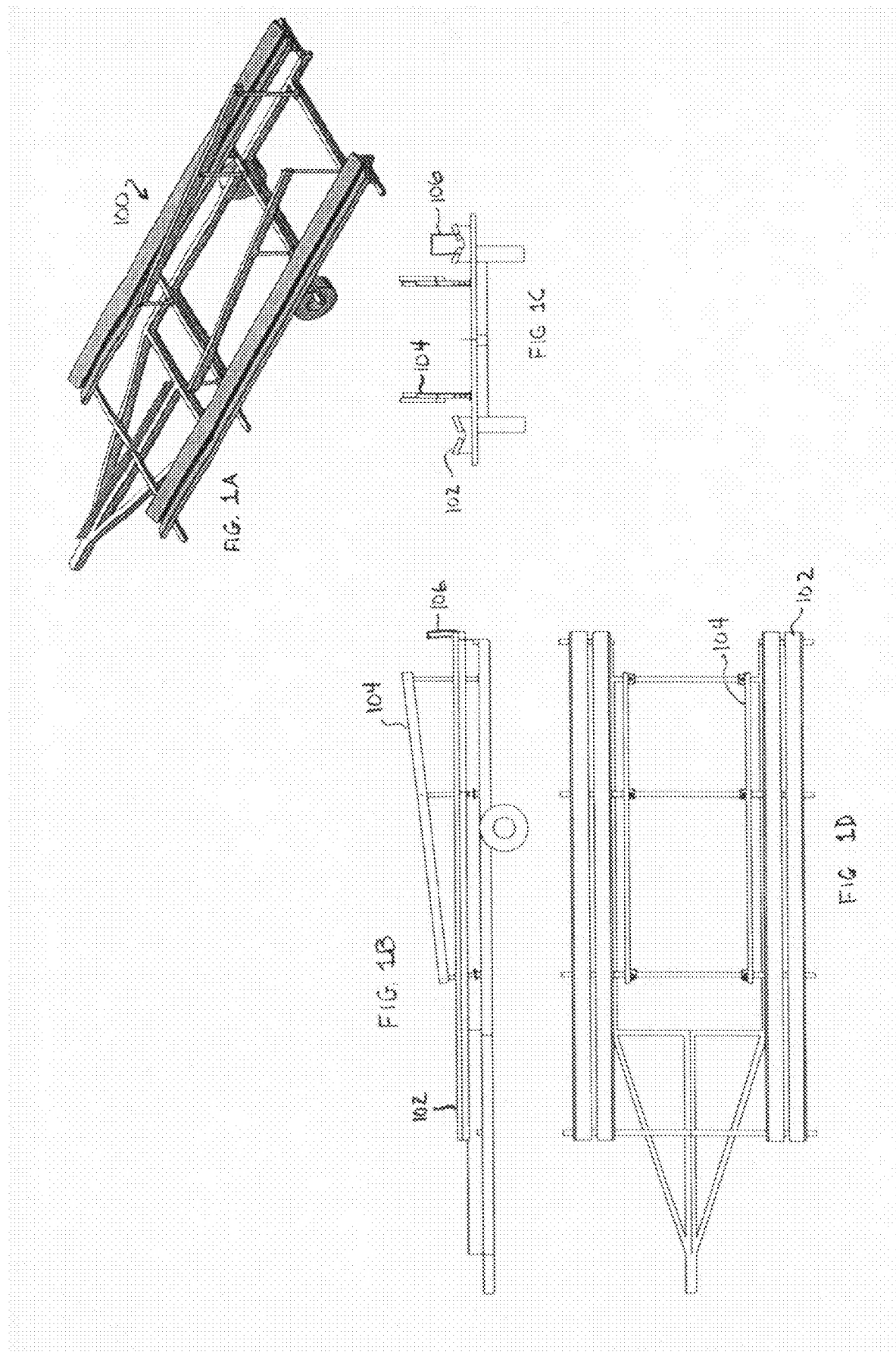

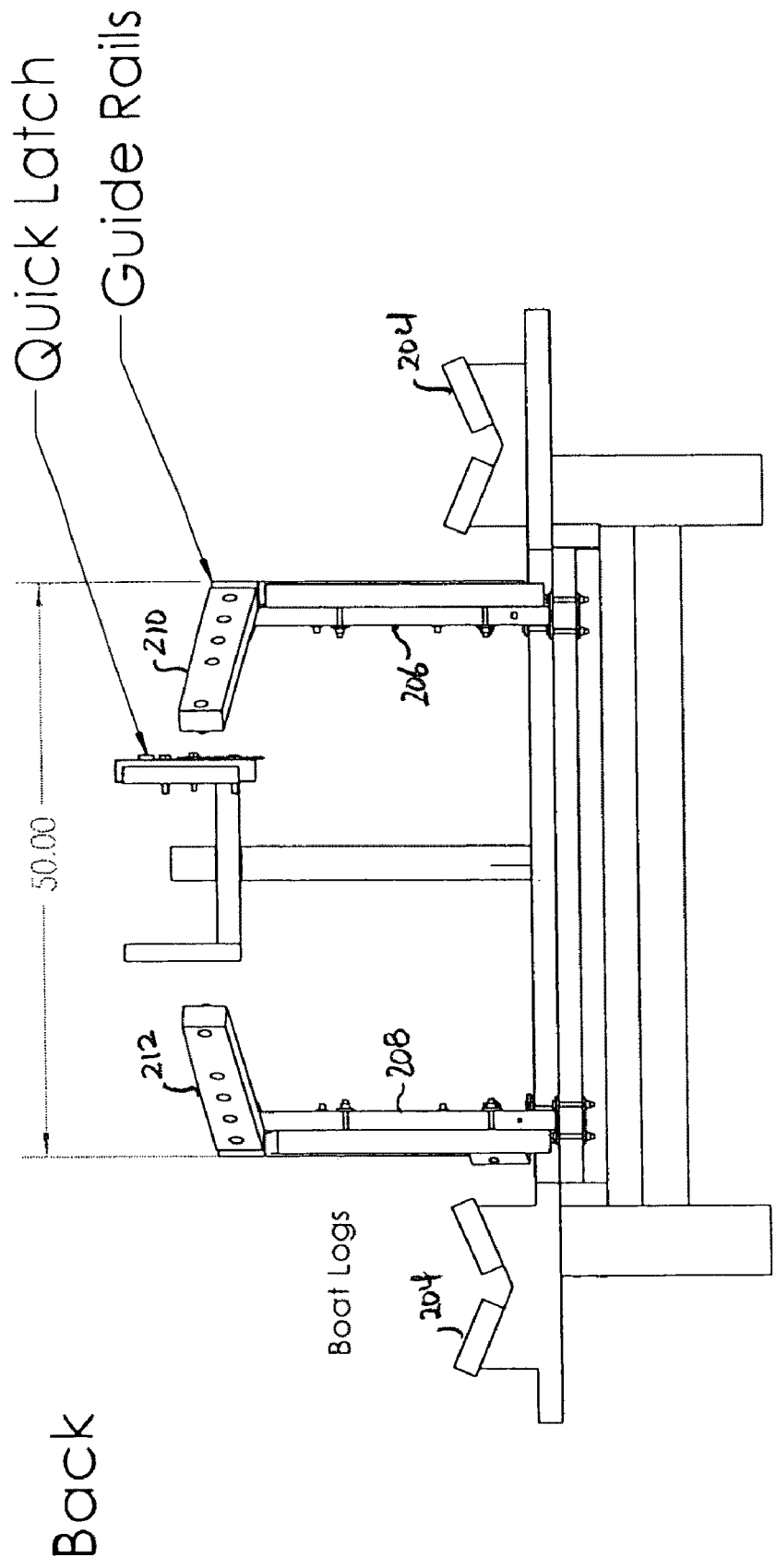

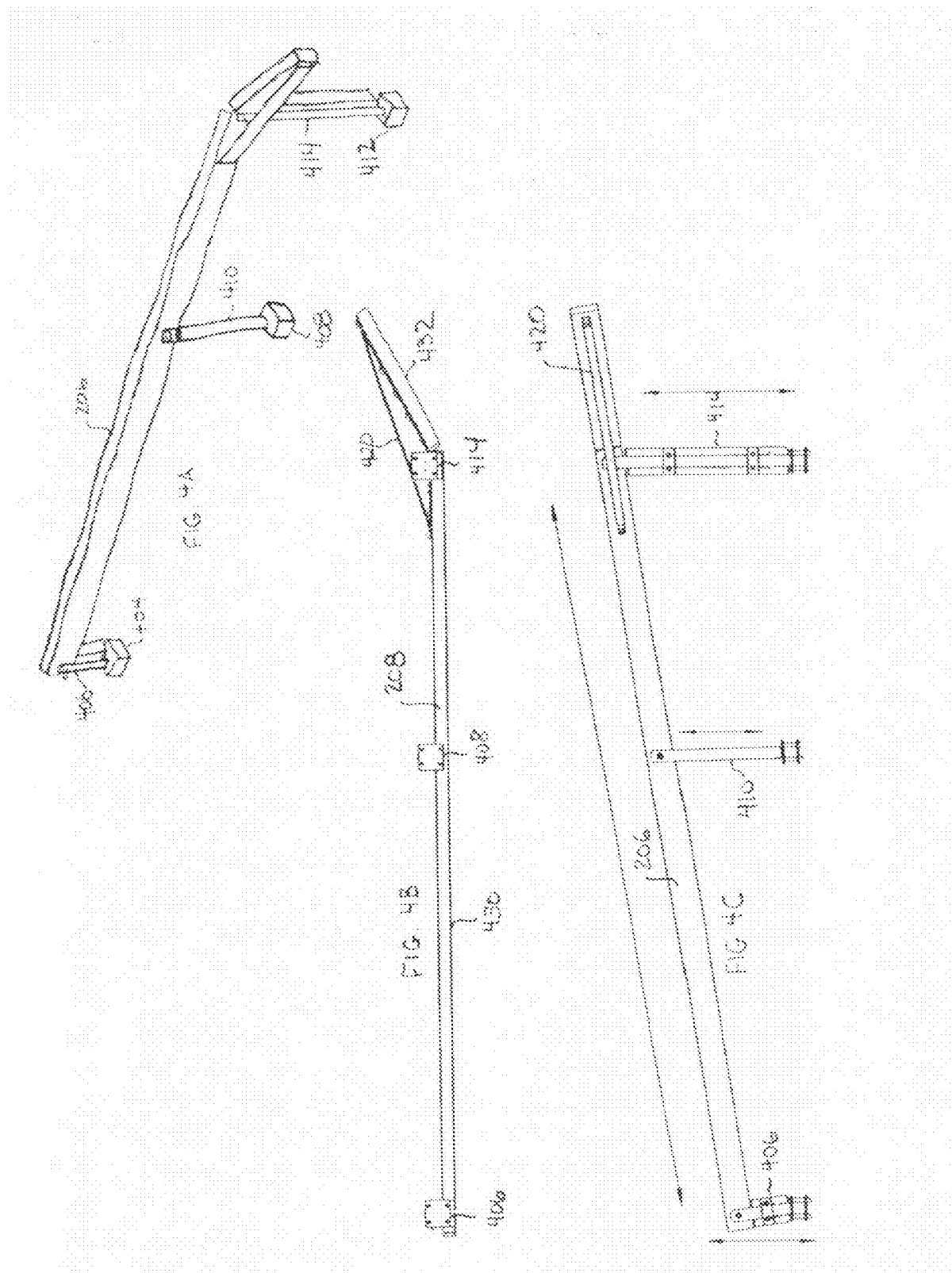

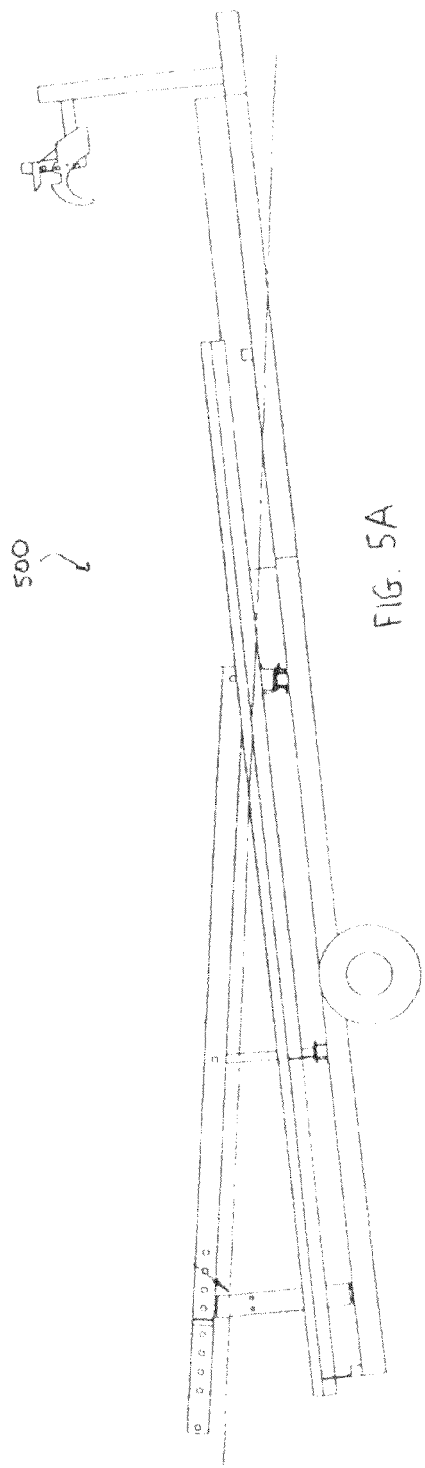
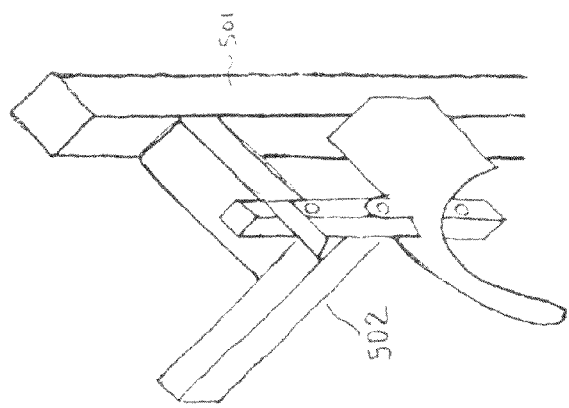
FIG. 5A
FIG. 5B

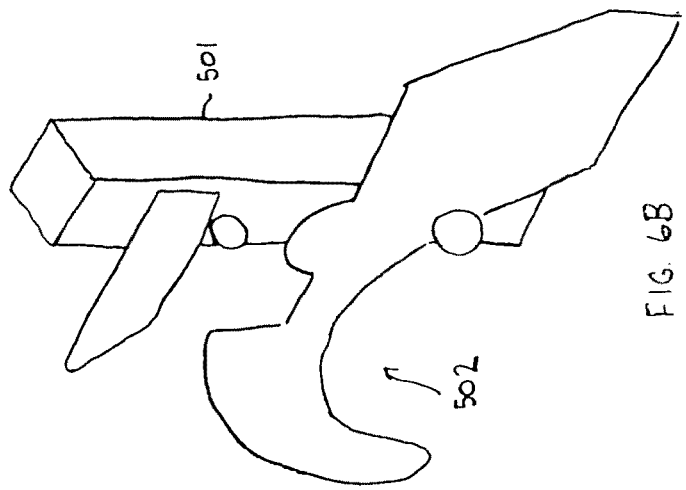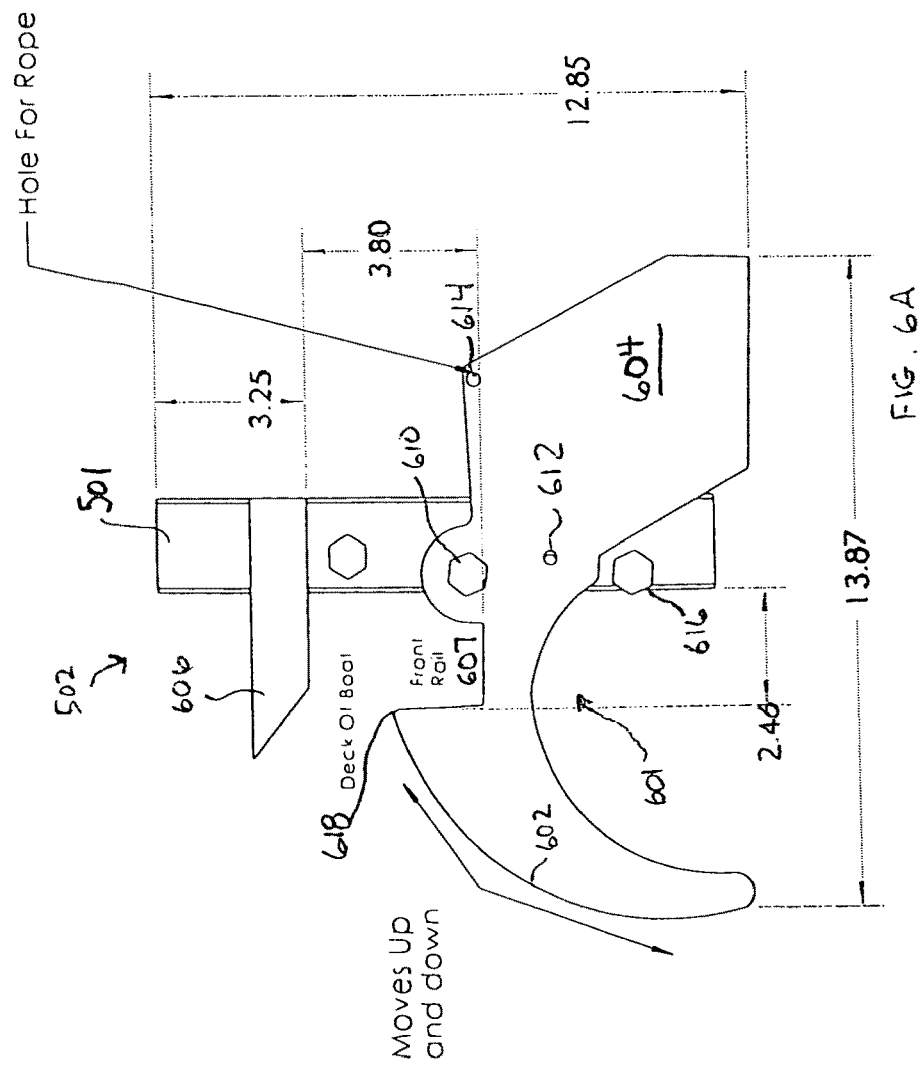

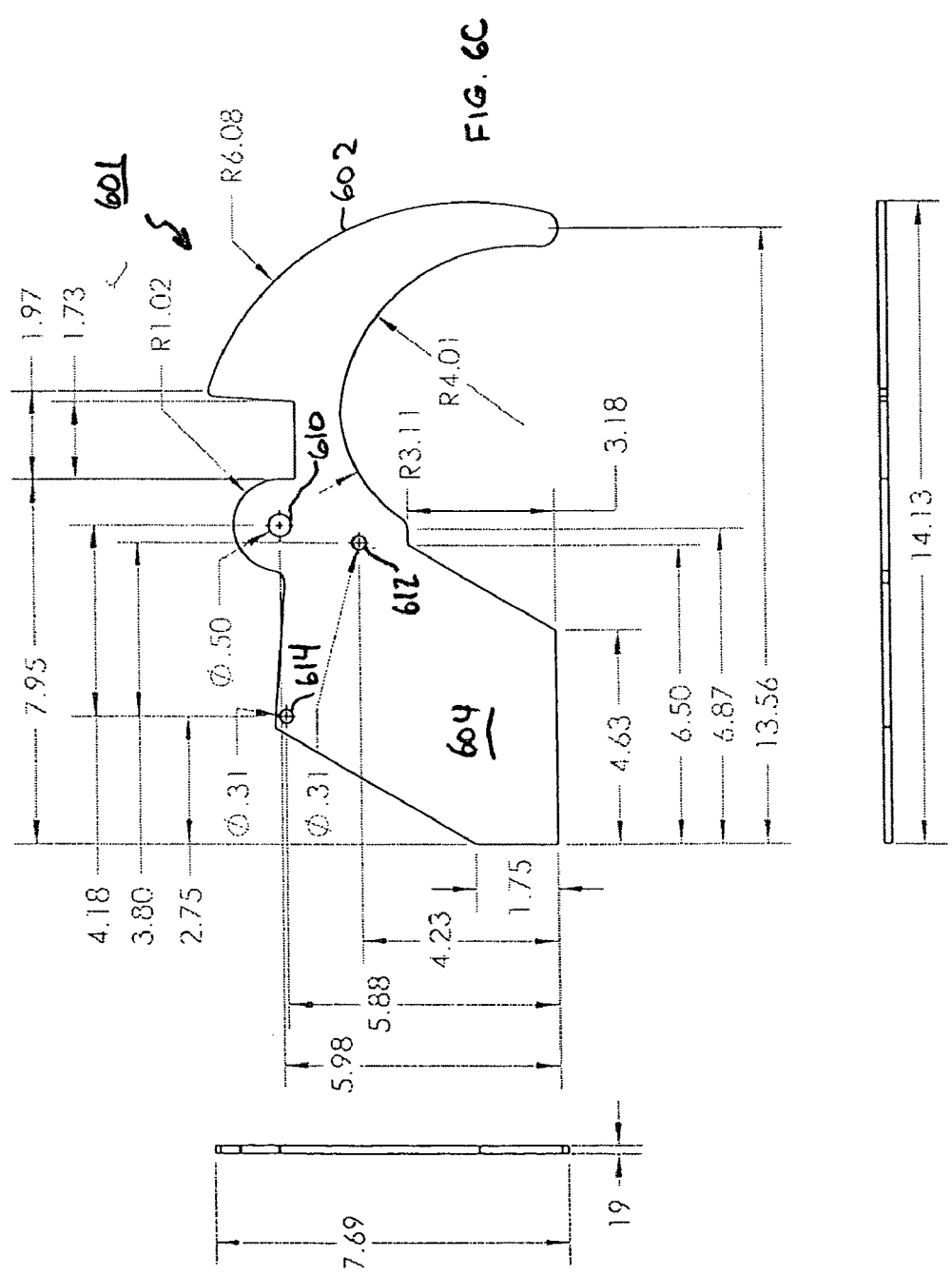

BOAT TRAILER WITH ADJUSTABLE RAILS AND AN AUTOMATIC LATCH

BACKGROUND

Field

The present invention relates generally to boat trailers and, more particularly, to guide rails on a boat trailer.

While boating is fun and relaxing, there are some tasks associated with boating that are not always pleasant. One task that many boaters do not enjoy is that of loading the boat back onto the trailer in order to remove the boat from the water. In particular to pontoon-style boats, aligning the pontoons onto the support rails of a trailer is particularly difficult under rough conditions such as windy conditions.

Accordingly, one solution has been the addition of guide rails on a trailer. The guide rails extend along the rear part of a trailer and are intended to fit inside the cavity between the pontoons so that the boat is aligned with the trailer and the support rails as it is driven or winched up onto the trailer. However, because boat ramps are sloped, the rear of the trailer, and thus the guide rails, are often underwater and unable to perform their intended purpose. Furthermore, the slope of boat ramps may vary greatly and thus a trailer with guide rails that possibly work at one ramp may not work at all at some other ramp.

Because it is difficult to drive the boat up onto the trailer, someone typically has to wade into the water and attach a line to the boat so that it can be winched up onto the trailer. There remains the need for a boat trailer that provides a simple and easy method to align a boat with the trailer so that it can be driven up onto the trailer and latched into place without difficulty.

SUMMARY

The present invention relates to a boat trailer that has sloped and adjustable guide rails which are higher at the rear of the trailer as compared to the front of the trailer. Accordingly, when backed down a boat ramp the guide rails extend above the water in order to engage the pontoons of a boat. This arrangement of guide rails allows a boat to be powered onto the trailer where it can automatically be latched into place.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of a boat trailer are illustrated by way of example, and not by way of limitation, in the accompanying drawings, wherein:

FIGS. 1A-1D illustrate an embodiment of a boat trailer in accordance with the principles of the present invention;

FIGS. 2A and 2B illustrate another embodiment of a boat trailer in accordance with the principles of the present invention;

FIGS. 4A-4C illustrate a more detailed view of a boat trailer guide rail in accordance with the principles of the present invention;

FIGS. 5A and 5B illustrate a latch system for a boat trailer in accordance with the principles of the present invention; and FIGS. 6A-6C illustrate a more detailed view of the latch system of FIG. 5B.

DETAILED DESCRIPTION OF THE PREFERRED EMBODIMENTS

Figure 2A:
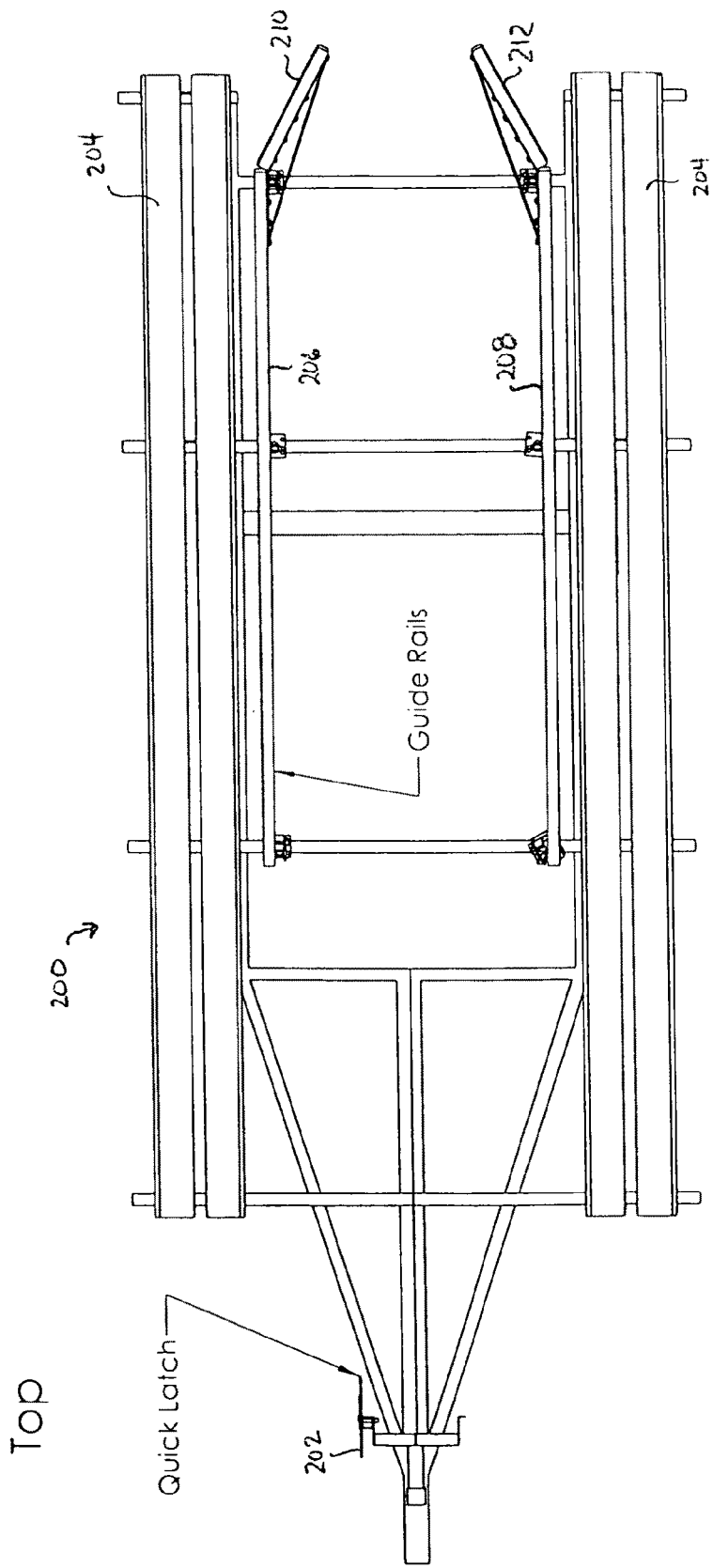

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

FIGS. 1A-1D illustrate an embodiment of a boat trailer in accordance with the principles of the present invention. FIG. 1A shows a perspective view of one embodiment of a boat trailer in accordance with the principles of the present invention. One of ordinary skill will recognize that the materials and manufacture of such a trailer 100 will be such that they can withstand the forces and weight of supporting a boat, traveling over a road, and being periodically submerged in water. Thus, lightweight but strong and sturdy materials such as metal, wood, polymers, plastics and the like can be used for various portions of the trailer.

FIG. 1B shows a side view of the trailer 100 that highlights particular beneficial features of the present invention. The trailer includes support rails 102 on each side that extend the length of the trailer 100. Each of the support rails 102 are configured to support a respective pontoon of a pontoon boat. In addition, there are two guide rails 104 that extend upwardly and laterally from the floor of the trailer 100. In particular, the guide rail 104 is positioned inside of a support rail 102 and extends from about the halfway point of the trailer 100 to substantially the rear of the trailer 100.

Of particular benefit is that guide rail 104 slopes so that the height of the guide rail 104 is higher near the rear of the trailer. One of ordinary skill will recognize that various sizes, slopes and heights are contemplated within the scope of the present invention in order to accommodate different boats sizes, different pontoon sizes, different boat ramp heights and different boat ramp slopes. As described in more detail with respect to FIG. 3, the slope of the guide rails 104 allow easier and safer loading of a boat onto the trailer 100. Because boats vary in size, the distance between support rails may vary and the distance between the guide rails may vary as well. This variance may depend of the distance between pontoons on the boat. The guide rails are spaced and sized to fit within the cavity between the pontoons of the pontoon boat. The height of the guide rails may vary as well depending on the height of the pontoons. For example, the guide rail can not be so high as to prevent the pontoon from resting on the support rail but should be high enough at the rear of the trailer to extend above the water when the trailer is backed down a ramp for loading.

FIG. 1C shows a rear view of the trailer 100 and more clearly illustrates how the support rails 102 cradle the pontoon of a pontoon boat. FIG. 1D is a top view of the trailer 100 and more clearly illustrates how there is a respective support rail 102 and a guide rail 104 on each side of the trailer 100.

One optional feature that may be present in some embodiments of the present invention is a support rail stop 106 as shown in FIGS. 1B and 1C. This stop 106 may be present at the rear of one or both of the support rails 102. This stop has a height that allows the pontoon of the boat to float over top of when the boat is being loaded but is high enough to prevent the pontoon from sliding off the trailer when the trailer is being driven on a road. For example, the stop 106 may be about 6 to 12 inches high. It may be vertically aligned with the support rail but it may also be inclined backwards by about 0 to 25 degrees.

FIGS. 2A and 2B illustrate another embodiment of a boat trailer in accordance with the principles of the present invention. The trailer 200 of FIG. 2A is depicted from a top view and shows a boat latch 202, support rails 204 along each side of the trailer, and guide rails 206 and 208 along each side of the trailer 200. One difference in the trailer 200 as compared to the earlier trailer 100 is that the rear portions 210, 212 of the guide rails 206, 208 are slanted inwardly towards the centerline of the trailer 200. As can be appreciated, when a boat approaches the rear of the trailer 200 for loading, the slanted pieces allows for flexibility in the angle of approach. In other words, a boat will not have to be perfectly aligned with the guide rails 206, 208 in order to be successfully loaded. Instead, the slanted rear portions 210, 212 allow the pontoons of a boat coming in at an angle to be guided so as to align the boat with the straight portions of the guide rails 206, 208. Another difference in the design of the trailer 200 is that the slanted rear portions 210, 212 may extend past the rear of the trailer 200 so that a pontoon may make contact with that portion of the guide rails even sooner in the boat loading process.

Although discussed in more detail later, the latch system 202 holds the boat in place on the trailer while the boat is on the trailer and out of the water.

FIG. 2B shows a rear view of the trailer 200. This is similar to the view of the trailer that a person driving the boat would see when approaching the trailer. However, the water would obscure portions of this view. Form this view is apparent that the pontoons rest on the support rails 204 and are guided into position by the guide rails 206, 208. The boat would first make contact with the rear portions 210, 212 of the guide rails 206, 208 and then travel forward in the trailer as the boat comes further and further out of the water.

The guide rails 206, 208 are sized so that the outside edges are substantially the same as the inside cavity between the two pontoons of the boat. Of course, they can not be so close in tolerance that the boat binds up on the guide rails 206, 208 when being loaded. Furthermore, the outside edges of the guide rails 206, 208 may be covered in a material that is low in friction and will not mar the surface of the pontoon.

Figure 3:
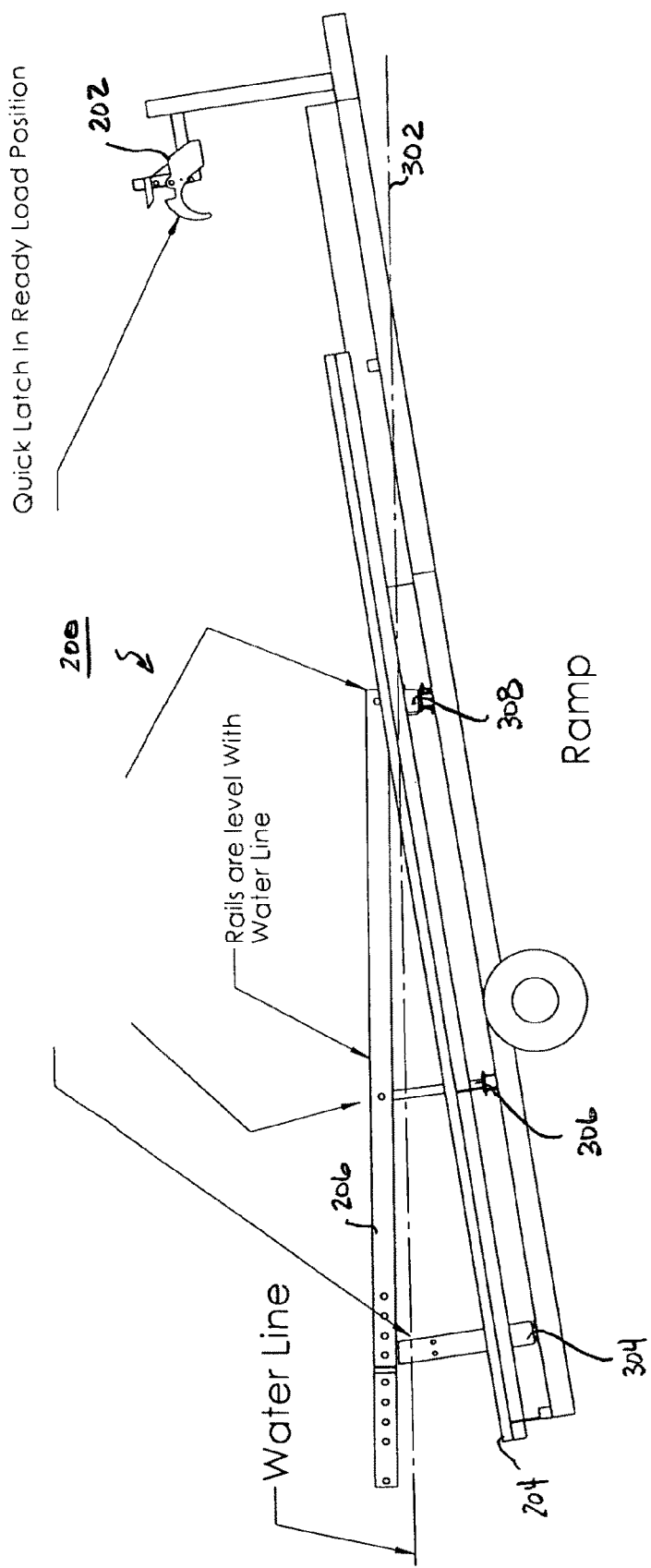
FIG. 3 illustrates an embodiment of the present invention in relationship to a boat ramp and water line.

FIG. 3 illustrates an embodiment of the present invention in relationship to a boat ramp and water line. The side view of trailer 200 depicts the latch system 202, one of the guide rails 206 and one of the support rails 204. As discussed previously, the guide rail 206 has a higher height near the rear of the trailer than near the center of the trailer. The benefit of this configuration can be seen in relationship to the water line 302. The side view of FIG. 3 shows what happens when the trailer 200 is backed down a ramp for loading (or unloading). The rear portion of the trailer 200 is submerged underwater so that the guide rail 206 must be higher near the rear to remain above the water line 302. The height of the guide rails at the rear of the trailer can be between about 20 to 36 inches depending on the boat size and ramp slope.

One way to accomplish the configuration depicted in FIG. 3 is to use different length support members 304, 306, 308. The support member 308 near the center of the trailer is shorter than the support member 304 near the rear of the trailer. The specific height of these support members can be selected based on the size of the pontoons, the length of the trailer and the slope of the ramp. The goal is to have the rear portion of the support rail 206 at or above the water line when the trailer is positioned on a boat ramp as shown in FIG. 3. With the guide rail 206 configured as shown, a boat can approach the trailer and come in contact with the guide rail 206 very early in the boat loading process. Accordingly, the boat will be aligned with the support rails very early in the loading process as well. With that confidence a user can approach the trailer at a speed and certainty that allows them to drive the boat almost completely onto the trailer without the assistance of a third party in the water.

FIGS. 4A-4C illustrate a more detailed view of a boat trailer guide rail in accordance with the principles of the present invention. Although not clearly shown in FIG. 3, the support members 304, 306, 308 may be adjustable in height so as to easily accommodate different boats sizes and different ramp conditions. FIG. 4A shows an isolated view of the guide rail 206. This figure illustrates three adjustable support members 406, 410, 414 that attach to the trailer. The attachment means 404, 408, 412 can be any of a variety of different methods without departing from the scope of the present invention. For example, welding or bolting the attachment means 404, 408, 412 to the trailer are exemplary techniques although other functionally equivalent techniques for securely holding and supporting the support members 406, 410, 414 are contemplated as well.

FIG. 4B depicts a top view of the guide rail 208 and shows relative positions of the support members 406, 408, 414 along the length of the guide rail 208 that provide a strong and secure guide rail that can adequately handle the forces of loading a pontoon boat along the straight portion 430 and the slanted portion 432 of the guide rail 208. The brace 420 provides additional strength and support for the rear slanted portion 432. While the example guide rails in the figures have only three support members, one of ordinary skill will recognize that fewer, or even more support members could be used without departing from the scope of the present invention.

The side view of FIG. 4C shows one possible construction of the support members 406, 410, 414. The support member 414 can, for example, be a telescoping assembly with an adjustable height. For example, one tube could be slidably adjusted within an outside tube and there can be holes for a locking pin. When the sliding tubes are adjusted to the right height, then a pin could be slid into the holes in the tubes to lock the support member 414 into place. Other methods of accomplishing a height adjustable member can be utilized as well. For example, a pneumatically adjustable support member 414 could be used. The support member 406 may be designed similarly to that just described with relation to support member 414 although the range of travel of support member 406 may be less than that of the larger support member 414. In practice, the range of heights of member 406 is limited so that the upward slope of the guide rails is always present. As shown, the support member 406 may be hinged to be able to tip forwards so that the other support members of guide rail 206 do not cause binding as the height is being adjusted. The center support member 410 may also be a telescoping member as previously described but instead of locking in place simply moves up and down to accommodate the setting of the other support members 406, 414.

One alternative to having support members that lock into a particular height setting is to allow of them to freely slide up and down. In this instance, the guide rails can be made buoyant so that they always adjust to a height along the surface of the water. By selecting the buoyancy such that the bottom of the guide rails rest on the water's surface, the trailer can be used on any ramp and the adjustable guide rails will operate as intended to align the boat with the trailer while loading. In this operation, the front most support member 406 may be fixed with the other support members 410, 414 free to move up and down based on the water's depth.

FIGS. 5A and 5B illustrate a latch system for a boat trailer in accordance with the principles of the present invention. As mentioned briefly, one benefit of having the guide rails designed as previously discussed is that the person loading the boat can approach the trailer with speed and confidence. This allows the boat, in most case, to be driven up onto the trailer without the assistance of another person in the water. Because of this, a latch system is beneficial to secure the boat on the trailer. FIG. 5A shows a trailer 500 that has a post 501 near the front to which an exemplary latch system 502 can be attached. As the boat is driven up onto the trailer a portion of the boat operates the latch system 502 such that the boat is securely held on the trailer 500.

FIGS. 6A-6C illustrate a more detailed view of the latch system of FIG. 5B. The latch 502 includes a portion that is activated by the front rail of the boat and then latches onto the front rail to securely hold the boat. In describing the latch 502, the front of the latch is considered to be the portion of the latch that first comes in contact with the boat and the rear of the latch is the portion farthest from the boat. This convention is to aid in describing the latch but is not intended to limit the latch or its configuration on a trailer.

In operation, the main body 601 of the latch 502 rotates about a pin 610. There is an front edge portion 602 that is curved and a rear portion 604. The mass of the rear portion 604 is larger than that of the front edge portion 602. This difference in mass causes rotation around the point 610 such that the latch 502 is typically in the closed position. A stop mechanism 616 (which can be one of the fastening members of the latch) can be used to limit rotation of the main body 601. Two optional features are a top bar 606 and a safety system 612. The top bar 606 can be positioned at a height that keeps a boat from bouncing out of the latch as the trailer is being driven along the road. For instance, a boat that is latched may have a deck that sits below the top bar 606. As the boat bounces up and down on the road, the deck will come into contact with the top bar 606 on a particularly severe bounce and be prevented from bouncing any higher. The safety system 612 can include a hole that travels through the main body 601 and accepts a pin. When the pin is in place, the main body 601 is prevented from rotating around the point 610.

To understand the operation of the latch, it must be remembered that the boat is mainly supported by the support rails of the trailer, thus, the height of the latch system 502 is adjusted on the post 501 to engage the front rail of a boat but not support the weight of the boat. In operation, a boat approaches the latch system 502 and comes in contact with the front edge portion 602. The curvature of the portion 602 causes the main body 601 to rotate counter clockwise and reveal the opening 607 to the front rail of the boat. Once the front rail slips past the corner 618 of the front edge portion 602, there is no longer any downward pressure on that front portion 602 so the main body 601 is able to pivot back up. As a result, the front rail of the boat is latched into the opening 607. To release the latch when it is time to unload the boat in the water, the point 614 is raised which rotates the main body 601 counter clockwise. To aid in this operation, a line or cable may be tied or secured to point 614 such that a person on the deck of the boat or elsewhere can release the latch.

FIG. 6B shows a perspective view of the latch 502 attached to a trailer's post 501 and FIG. 6C shows a specific embodiment of the main body 601 that operates as discussed above. The dimensions provided in the drawings are examples of relative sizes that can be used. One of ordinary skill will recognize that the sizes can be proportionally changes to accommodate boats having different sized front rails and different sized decks.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with each claim's language, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A boat trailer comprising:
   a platform configured to be towed by a vehicle over land;
   a first support rail, on said platform, configured to cradle a first boat pontoon;
   a second support rail, on said platform, configured to cradle a second boat pontoon;
   a first guide rail proximate said first support rail on said platform, the first guide rail extending from about a center of the platform to a rear of the platform;
   a second guide rail proximate said second support rail on said platform, the second guide rail extending from about a center of the platform to a rear of the platform;
   a first adjustable support member configured to attach the rear portion of the first guide rail to the platform, wherein a length of the first adjustable support member is adjustable;
   a second adjustable support member configured to attach the rear portion of the second guide rail to the platform, wherein a length of the second adjustable support member is adjustable; and
   wherein a respective height of each of the first guide rail and second guide rail is adjustable such that a respective rear portion of each of the first and second guide rails is higher above the platform than a respective front portion of each of the first and second guide rails.

2. The boat trailer of claim 1, further comprising:
   a third adjustable support member configured to attach the front portion of the first guide rail to the platform, wherein a length of the third adjustable support member is adjustable; and a fourth adjustable support member configured to attach the front portion of the second guide rail to the platform, wherein a length of the fourth adjustable support member is adjustable.

3. The boat trailer of claim 1, wherein the first guide rail and the second guide rail are buoyant and are configured to float when submerged in water such that the respective rear portions of the first and second guide rails rise above a water line.

4. The boat trailer of claim 1, further comprising:
a first slanted portion coupled to the rear portion of the first guide rail, such that the first slanted portion is inclined, in a horizontal plane, towards a centerline of the trailer; and
a second slanted portion coupled to the rear portion of the second guide rail, such that the second slanted portion is inclined, in a horizontal plane, towards a centerline of the trailer.

5. The boat trailer of claim 4, wherein each of the first and second slanted portions extend past the rear of the platform.

6. The boat trailer of claim 4, further comprising:
a first brace configured to secure the first slanted portion to the first guide rail; and
a second brace configured to secure the second slanted portion to the second guide rail.

7. The boat trailer of claim 1 further comprising:
a first boat stop coupled to a rear portion of the first support rail and extending vertically upward from the first support rail; and
a second boat stop coupled to a rear portion of the second support rail and extending vertically upward from the second support rail.

8. The boat trailer of claim 1, further comprising:
a latch proximate a front of the platform, said latch configured to engage a front portion of a boat on the boat trailer.

9. The boat trailer of claim 8, wherein the latch includes:
a rounded front portion;
a pivot point;
a rear portion; and
wherein said rounded front portion is configured to rotate around the pivot point when contacted by a leading edge of the boat.

10. The boat trailer of claim 9, wherein the latch further comprises:
a notch between the rounded front portion and the pivot point configured to accept a front rail of the boat.

11. The boat trailer of claim 9, wherein the latch further comprises:
a pull attached to the rear portion, said pull configured to cause the latch to open.

12. A boat trailer comprising:
a platform configured to be towed by a vehicle over land;
a first support rail, on said platform, configured to cradle a first boat pontoon;
a second support rail, on said platform, configured to cradle a second boat pontoon;
a first guide rail proximate said first support rail on said platform, the first guide rail extending from about a center of the platform to a rear of the platform;
a second guide rail proximate said second support rail on said platform, the second guide rail extending from about a center of the platform to a rear of the platform;
a first telescoping support member configured to attach the rear portion of the first guide rail to the platform, wherein a length of the first telescoping support member is adjustable;
a second telescoping support member configured to attach the rear portion of the second guide rail to the platform, wherein a length of the second telescoping support member is adjustable; and
wherein a respective height of each of the first guide rail and second guide rail is adjustable such that a respective rear portion of each of the first and second guide rails is higher above the platform than a respective front portion of each of the first and second guide rails.

13. The boat trailer of claim 12, further comprising:
a first locking mechanism configured to lock the first telescoping support member at a fixed height; and
a second locking mechanism configured to lock the second telescoping support member at a fixed height.

14. The boat trailer of claim 13, wherein the first and second locking mechanisms comprise a respective pin configured to fit within one of a plurality of respective holes in the first and second telescoping support members.

* * * * *